F. TWYMAN.
APPARATUS FOR PRODUCING AND LOCALIZING SOUND.
APPLICATION FILED FEB. 23, 1915.

1,287,595.

Patented Dec. 10, 1918.
3 SHEETS—SHEET 1.

Witnesses:

Inventor
Frank Twyman
by Byrnes Townsend Brickenstein
Attys

F. TWYMAN.
APPARATUS FOR PRODUCING AND LOCALIZING SOUND.
APPLICATION FILED FEB. 23, 1915.

1,287,595.

Patented Dec. 10, 1918.
3 SHEETS—SHEET 2.

Witnesses:—
E. Daniel
R. I. Hulsizer

Inventor
Frank Twyman
by
Byrnes Townsend & Buckenstein
Attys.

F. TWYMAN.
APPARATUS FOR PRODUCING AND LOCALIZING SOUND.
APPLICATION FILED FEB. 23, 1915.
1,287,595.
Patented Dec. 10, 1918.
3 SHEETS—SHEET 3.
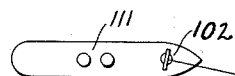
Fig. 8.
Fig. 9.
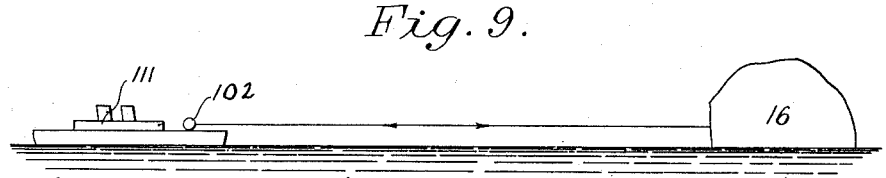
Fig. 10.
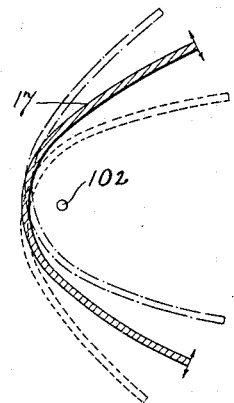
Fig. 11.
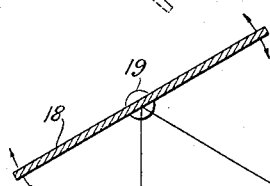
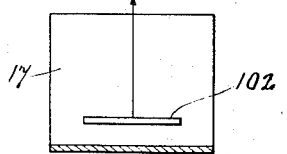

UNITED STATES PATENT OFFICE.

FRANK TWYMAN, OF LONDON, ENGLAND.

APPARATUS FOR PRODUCING AND LOCALIZING SOUND.

1,287,595.      Specification of Letters Patent.      Patented Dec. 10, 1918.

Application filed February 23, 1915. Serial No. 10,044.

*To all whom it may concern:*

Be it known that I, FRANK TWYMAN, a subject of the King of the United Kingdom of Great Britain and Ireland, residing at 1 Linden road, Muswell Hill, London, England, have invented new and useful Improvements in Apparatus for Producing and Localizing Sound and in Arrangements of Such Apparatus, of which the following is a specification.

This invention relates to apparatus for localizing sound. It is the general object to selectively propagate sound in desired directions and produce zones of marked diminution of sound or relative silence to both sides of the line or zone of sound propagation.

It is the more specific object to localize sound to the neighborhood of a plane perpendicular to a row of sound emitting elements.

Further objects of this invention are to produce intermittent and dirigible sound beams of this character.

The new apparatus wherewith these objects are attained may be applied to various purposes both on land and sea, but is particularly applicable to marine purposes, for example, for guiding or warning ships at sea.

The invention essentially consists in providing, for the purposes named, a source of sound consisting of a row of sound emitting elements such as sirens, which are uniformly disposed substantially in a straight line and which emit sound waves which are synchronous, *i. e.* of equal wave length and in the same phase, and are of equal amplitude. The degree of localization will depend upon the ratio of the length of said row to the wave length of the sound waves emitted. If the total length of the row be equal to a large number of wave-lengths the sound will, for a considerable distance, be restricted very closely to the neighborhood of a plane at right angles to the row. If the length of the row is equal only to a few wave-lengths the sound will begin to spread, or become less localized, at a shorter distance from the row of sound emitting elements, but, when spreading, will still be substantially confined to a narrow region which is symmetrically disposed about the said plane at right angles to the row. The sound will therefore still be to a certain extent localized.

The invention further consists in the arrangement of two or more apparatuses comprising sources of sound of the character described for producing two or more localized sound beams of the same or different pitch, in order to mark the boundaries of navigation channels or other areas in the above described manner.

The invention further consists in providing means for producing intermittent sound of the character described, and for directing such sound. The means for the latter purpose may consist of large reflecting screens from which the beam of sound will be reflected in a manner analogous to the reflection of light, the rotation of the screen producing a rotation of the beam equal to twice the rotation of the screen. Or alternatively, the entire row of sound emitting elements may be rotated about an axis at right angles to their assembled length.

Devices, such as reflectors, may also be provided for focusing or concentrating the sound in a portion or portions of the plane in which it is desired the sound be localized.

The accompanying drawings illustrate some embodiments of the present invention, as well as their manner of application. In these drawings:—

Figs. 10, 11 illustrate the mode of directing the sound by means of reflectors.

Figure 1:
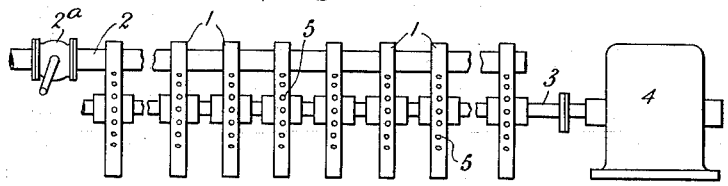
Figure 1 shows one form of a multiple siren.

Referring to the drawings, Fig. 1 represents a row of sirens, 1, 1, 1, which constitute the sound emitting elements. One of these sirens is shown on a larger scale in Figs. 2 and 3 and will presently be described. The sirens are supplied with air or gaseous fluid by way of a pipe 2, from which various branches connect to the sirens 1. Sound is emitted from the outlets 5 in the stationary portions of the sirens. The shaft 3 whereon the rotatable portions of the sirens are commonly mounted is driven in any suitable manner, either by external means, or, when the apertures in the sirens are, in known manner, suitably formed, by the action of the air or gaseous fluid supplied to the sirens. The means preferred are however external, and an electric motor 4 may be employed for this purpose.

Figure 2:
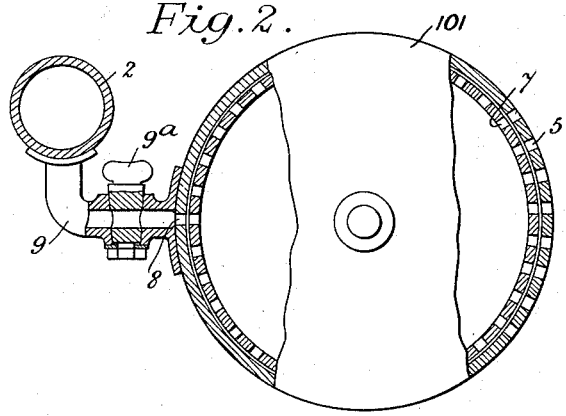
Figs. 2 and 3 are sectional views of the preferred form of unit siren.
Figure 3:
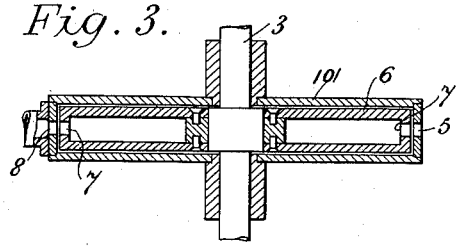

It will of course be understood that the sirens 1 may be of any suitable form, but in order to explain more clearly the particular arrangement of these sirens, reference will now be made to the preferred form of siren shown in Figs. 2 and 3. This siren comprises an outer casing 101, which is stationary, and an inner casing 6, which rotates within the outer casing and is journaled in the latter by means of the shaft 3. The inner casing or drum 6 is provided with a predetermined number of equally spaced holes 7 in its periphery. The outer casing 101 is provided with an inlet hole 8 and a number of outlet holes 5, the latter being located at that portion of the casing from which the sound is to be delivered. These holes 5 have an angular pitch equal to that of the holes 7. The inlet holes 8 are provided with air or with gaseous fluid, such as steam, from the pipe 2, and a suitable connecting branch 9 provided with a cock $9^a$ may be employed for this purpose.

When the row of sirens or multiple siren shown in Fig. 1 is assembled the apertures 7 and 5 are similarly placed in the case of each unit siren, and in that way the sounds emitted are cophasal. The apertures being all substantially of equal size and the air pressure being substantially constant for all the units, the amplitude of the sounds emitted from the individual units are also substantially equal. To obtain still more perfect equality in the amplitudes, a final adjustment may be made by means of cocks (as $9^a$).

Figure 7:
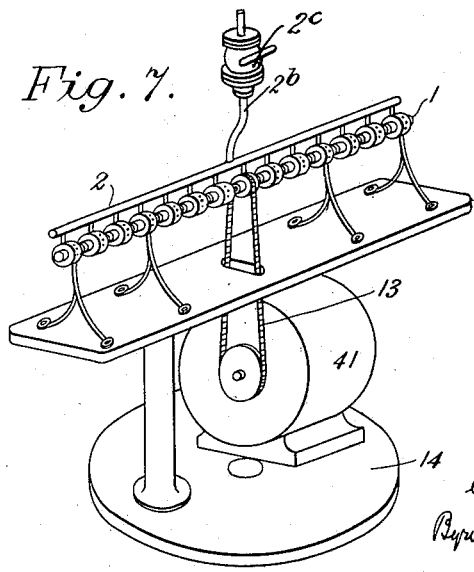

Means such as a suitably actuated valve $2^a$ may be employed for periodically cutting off the air supply, and so producing intermittent sound. The entire apparatus shown in Fig. 1 may also be mounted to rotate on a vertical axis as shown in Fig. 7 for the purpose of directing the sound in any desired direction. The row of unit or elemental sirens may also be arranged vertically instead of horizontally.

Figure 4:
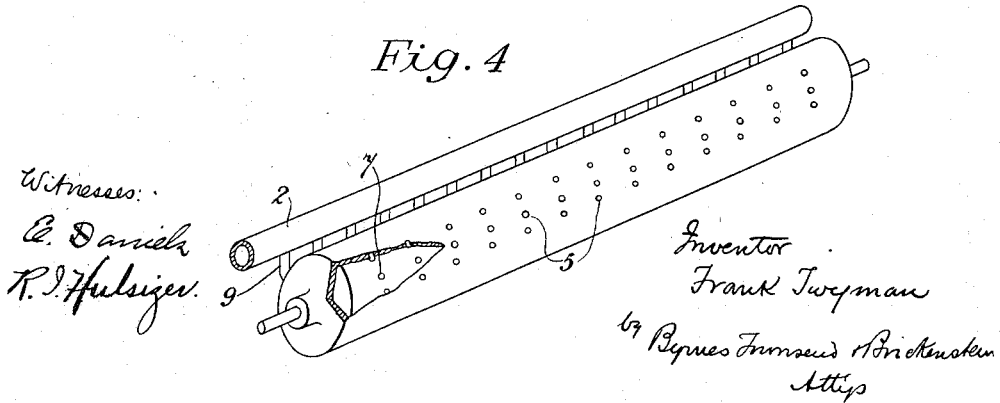
Fig. 4 illustrates a modified form of multiple siren.

Instead of a plurality of fixed and rotatable drums being employed one long fixed drum, Fig. 4, with a smaller, similar, rotatable drum within it, may be employed. The inner drum would then be provided with a plurality of apertures uniformly distributed longitudinally with respect to the drum, and also uniformly distributed around the periphery of the latter. The number of apertures in each ring of holes would be equal. Outlet apertures 5 are provided on that side of the outer drum from which it is desired that the sound be emitted, and these apertures at predetermined moments register with apertures in the inner drum, just as the apertures 5 register with the apertures 7 in Fig. 2. In the sirens shown in Figs 1 to 4 the apertures for the blast are located only in the circumferential periphery of the drum.

Figure 5:
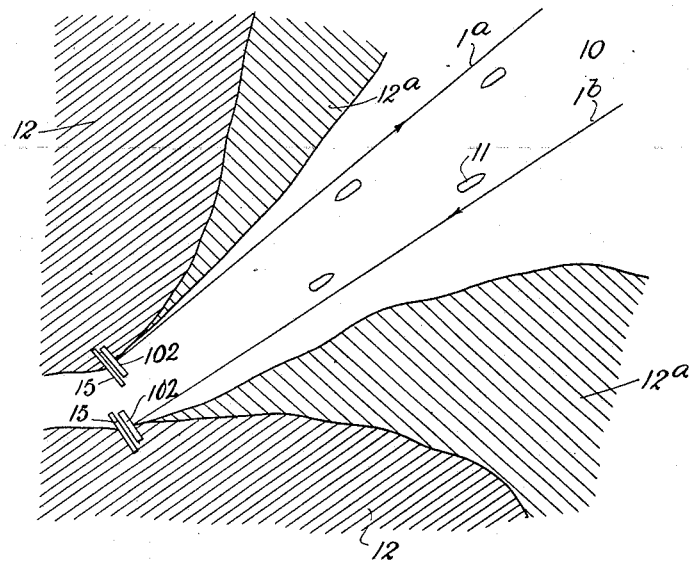
Figs. 5 and 6 show the manner in which the invention is applied to navigation purposes, and Figs. 7, 8 and 9, the manner in which it is applied to ships with the object of detecting obstacles.

Fig. 5 shows one mode of employment of the multiple siren, and diagrammatically represents the entrance to a harbor. The multiple sirens 102, 102 are mounted in such manner that the planes $1^a$, $1^b$, of localized sound mark out the navigation channel 10 between the sand-banks $12^a$. The plane $1^a$ is preferably pitched differently from the plane $1^b$ so that if a vessel 11 deviates from its course, e. g., during a fog, in the direction of one plane $1^a$ or of the other one $1^b$, those in charge of the vessel would understand, from the pitch of the sound, in which direction the vessel must be steered to keep its course. The multiple sirens 102, 102 are mounted at suitable places on the shore 12, and in some cases a large number of differently pitched sirens may be employed, e. g., when the channel is a winding one. Each multiple siren may be provided at its rear with a reflector such as hereinafter described or with a sound absorber 15. As an absorber such known means as loosely hung felt or textile material may be employed.

Figure 6:
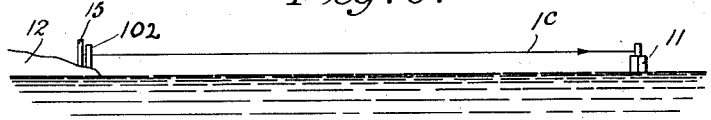

Fig. 6 shows an arrangement of sirens such as might be employed for many of the existing purposes for which known sirens are at present employed. The multiple siren 102 is here mounted on a vertical axis either on the shore 12 or in some case on a lightship. Owing to the sound being localized on a horizontal plane $1^c$, a ship 11 will receive a greater intensity of sound for the same expenditure of energy in the siren, than is the case with existing sirens.

Figs. 7, 8 and 9 relate to an arrangement of sirens on board ship. The row of sirens 102, which is here driven by means of chain gearing 13 driven by the motor 41, is mounted on a revoluble, horizontal base 14. The air or gaseous fluid is admitted to the pipe 2 from a vertical pipe $2^b$ coaxial with the base 14. The multiple siren 102 is mounted near the bow of the vessel 111 (Figs. 8 and 9), and during a fog is continually oscillated through a predetermined number of degrees to the port and starboard bow of the vessel. A valve $2^c$, which is connected to pipe $2^b$, is also provided for producing an intermittent sound. When the ship approaches a prominent object or an obstruction 16, such as a ship, rock, iceberg or the like, the sound beam delivered by the multiple siren is reflected by the obstacle and the echo is audible on the ship, the time which elapses from the delivery of the sound to the receipt of the echo being a measure of the distance of the obstruction from the ship. Owing to the sound beam being directed by the row of sirens 102, the echo would be far greater than when the sound is not localized. Moreover owing to the direction of the sound beam being known when the echo is heard, the bearing of the echoing obstacle 16 can be very accurately determined.

It has already been proposed to employ sirens on board ship for detecting prominent objects at sea and to direct the waves emitted by the siren in such manner as to search for such objects, the reflected waves from the latter being received on the ship by suitable apparatus. The sirens and directing means employed for this purpose were, however, to be of the forms known at the date of such proposal.

It is obvious that a rotating beam such as employed on the vessel 111 in Figs. 8 and 9 might also be employed on land, for marine or other signaling purposes for example. In that manner not only could ships be located during a fog, but warnings could be delivered to ships during foggy weather in just the same way that they are delivered to ships during clear weather by means of the revolving beams of lighthouses.

Fig. 10 shows a vertical section of an arrangement of reflector which may be employed when it is desired to concentrate the sound in a portion of the plane in which it is desired that the sound be localized. The lower portion of Fig. 11 shows a horizontal section of the same arrangement. The vertical section of the reflector 17 is substantially a parabola, of which the axis of the multiple siren 102 forms the focus. Reflectors generated by the revolution of a parabola about its major axis are of course known for reflecting sound emitted substantially at one point. The present reflector is however of constant vertical section.

The reflector 17 needs in practice to be of large dimensions in order to be effective. For example when the diameter of a unit siren is about 4½ inches, the distance between the two horizontal tips of the parabola would preferably be at least 30 feet.

The reflector 17 may be rotatably mounted about its focus, the axis of the multiple siren 102. In that manner the sound may be directed by the movement of the reflector and not of the siren. The dotted and chain-dotted lines in Fig. 10 show alternative positions of this reflector.

In Fig. 11 a plane reflector or screen 18 is rotatable about a vertical axis 19 in the plane of localized sound obtained from the multiple siren 102. When the reflector 18 is rotated about the axis 19 the reflector plane of sound 1ª will also rotate, the angular movement of the latter being exactly double that of the reflector 18. A parabolic reflector 17 may be simultaneously employed in this case also.

It is to be understood that any known receiver of sound may replace the human ear as the direct means for detecting such sounds.

It is also to be understood that the term sound applies also to vibratory movements of the air which are not audible, i. e. to waves of very great or very small wavelength. When such vibratory movements are emitted, any known receiver for detecting their presence may be employed.

Moreover, the expressions "plane of localized sound", "localized only in one plane" and similar expressions employed herein are understood to be only approximate. In practice the sound will be substantially localized between two planes or approximate planes which are at a short distance apart and are symmetrically disposed about the plane referred to in the said expressions.

While I prefer in practice to localize sound to the neighborhood of a plane at right angles to the row of sirens exclusively, by properly selecting the ratio of the distance between the individual sirens and the wave length of the sound emitted, I do not intend to be limited thereto. The device is practically operative also by proportioning the inter-siren distance and the wave length so that the sound is localized to the neighborhood of a plane perpendicular to the row of sirens and to linear or conical regions symmetrically distributed relatively to the row, zones of relative silence being included therebetween.

I therefore use the term "localized" to define linear or conical regions flanked by regions of comparative silence.

What I claim as my invention and desire to secure by Letters Patent is:—

1. Apparatus for producing a localized sound beam, comprising a row of sound emitting elements which are uniformly disposed substantially in a straight line and are adapted to emit synchronous sound waves of equal amplitude.

2. Apparatus for producing a localized sound beam, comprising a row of sirens which are uniformly disposed substantially in a straight line and are adapted to emit synchronous sound waves of equal amplitude.

3. Apparatus for producing a localized sound beam, comprising in combination a row of similar sirens which are uniformly disposed substantially in a straight line, means for rotating all the sirens at one speed, and means for supplying a blast to the sirens.

4. Apparatus for producing a localized sound beam, comprising in combination a row of similar sirens which are uniformly disposed substantially in a straight line, means for rotating all the sirens at one speed, means for supplying a blast to the sirens, and means for regulating the blast to each individual siren.

5. Apparatus for producing a localized sound beam, comprising in combination a rotatable shaft, a plurality of evenly disposed and similar sirens mounted on said shaft, and means for supplying a blast to the sirens.

6. Apparatus for producing a localized sound beam, comprising in combination a rotatable shaft, a plurality of evenly disposed and similar sirens mounted on said shaft, a blast pipe mounted longitudinally of the shaft, and T-connections from said pipe to each siren.

7. Apparatus for producing a localized sound beam, comprising in combination a rotatable shaft, a plurality of evenly disposed and similar sirens mounted on said shaft, a blast pipe mounted longitudinally of the shaft, T-connections from said pipe to each siren, and a regulating valve in each T-connection.

8. Apparatus for producing a localized sound beam, comprising a siren drum of an axial length considerably greater than its diameter and having a plurality of similar groups of circumferential apertures, the groups being evenly disposed in the axial direction, and means for supplying a blast to the siren drum.

9. Apparatus for producing a localized sound beam, comprising a row of sirens which are uniformly disposed substantially in a straight line and are adapted to emit synchronous sound waves of equal amplitude, each siren comprising a rotatable drum having apertures for the blast which are located only in the circumferential portion of the drum.

10. Apparatus for marking the boundaries of navigation channels and other areas, comprising two or more rows of sound emitting elements, which in each row are uniformly disposed substantially in a straight line and are adapted to emit synchronous sound waves of equal amplitude.

11. Apparatus for marking the boundaries of navigation channels and other areas, comprising two or more rows of sound emitting elements, which in each row are uniformly disposed substantially in a straight line and are adapted to emit synchronous sound waves of equal amplitude, the various rows being differently pitched.

12. Apparatus for producing an intermittent, localized sound beam, comprising a row of sirens which are uniformly disposed substantially in a straight line and are adapted to emit synchronous sound waves of equal amplitude, and means for supplying an intermittent blast to the sirens.

13. Apparatus for detecting the presence at sea of prominent bodies such as ships, rocks and icebergs, and for warning and signaling purposes at sea or on land, comprising in combination a row of sound emitting elements which are uniformly disposed substantially in a straight line and are adapted to emit synchronous sound waves of equal amplitude, and means for rotating the beam of sound produced by said sound emitting elements.

14. Apparatus for detecting the presence at sea of prominent bodies such as ships, rocks and icebergs, and for warning and signaling purposes at sea or on land, comprising in combination a row of sirens which are uniformly disposed substantially in a straight line and are adapted to emit synchronous sound waves of equal amplitude, and means for rotating the beam of sound produced by said sirens.

15. Apparatus for detecting the presence at sea of prominent bodies such as ships, rocks and icebergs, and for warning and signaling purposes at sea or on land, comprising in combination a row of sound emitting elements which are uniformly disposed substantially in a straight line and are adapted to emit synchronous sound waves of equal amplitude, and a rotatable parabolic reflector coaxial with the row of sound emitting elements.

16. Apparatus for detecting the presence at sea of prominent bodies such as ships, rocks and icebergs, and for warning and signaling purposes at sea or on land, comprising in combination a row of sound emitting elements which are uniformly disposed substantially in a straight line and are adapted to emit synchronous sound waves of equal amplitude, and a reflector rotatably mounted in the path of the sound beam produced by said row.

17. Apparatus for detecting the presence at sea of prominent bodies such as ships, rocks and icebergs, and for warning and signaling purposes at sea or on land, comprising a row of sound emitting elements which are uniformly disposed substantially in a straight line and are adapted to emit synchronous sound waves of equal amplitude, said row of sound emitting elements being revolubly mounted on an axis substantially at right angles to the row.

In testimony whereof I have signed my name to this specification in the presence of two subscribing witnesses.

FRANK TWYMAN.

Witnesses:
A. NUTTING,
O. J. WORTH.